United States Patent Office 2,944,092
Patented July 5, 1960

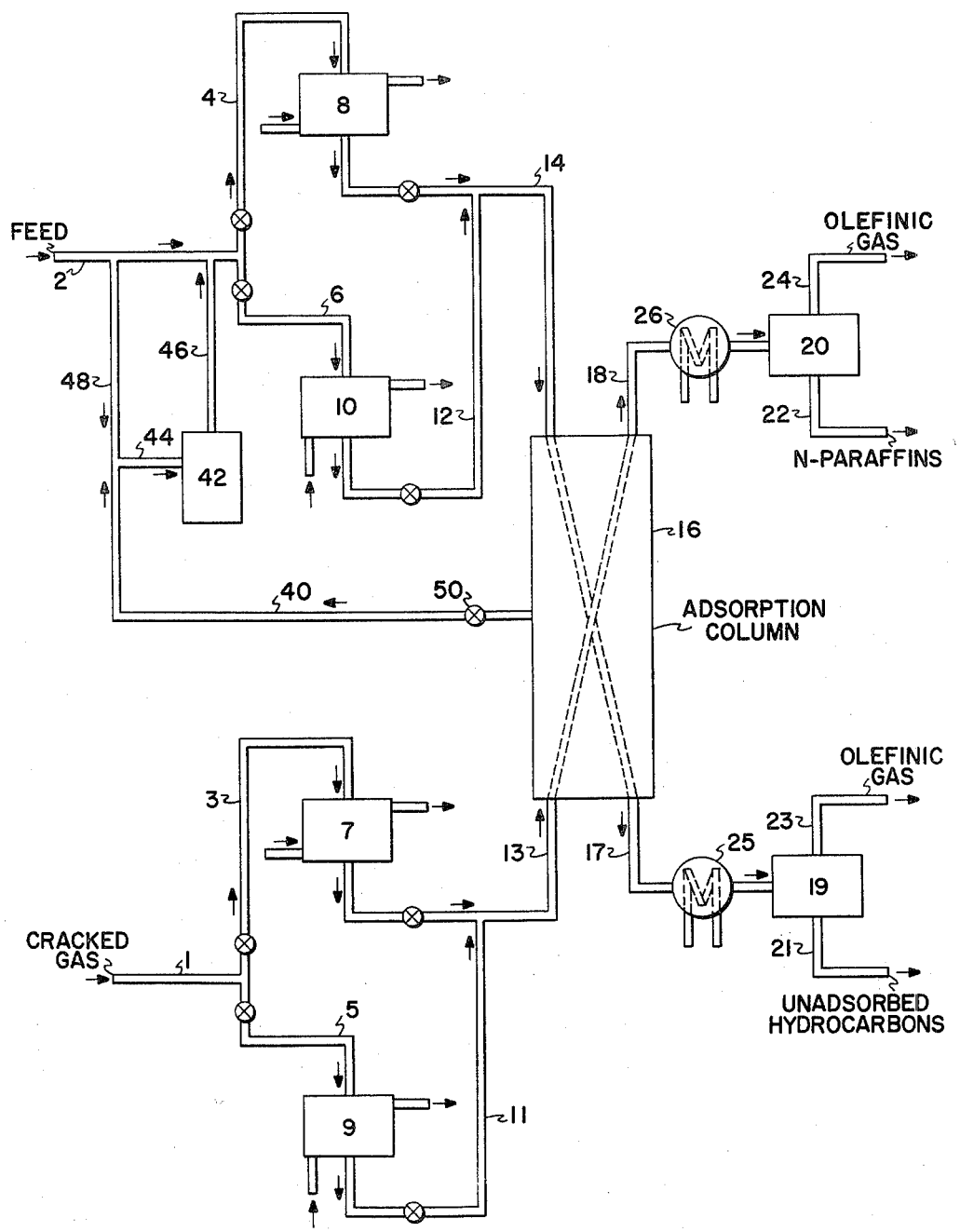

2,944,092

GASOLINE HYDROCARBON SEPARATION RECOVERY PROCESS USING ZEOLITIC MOLECULAR SIEVES

George F. Feldbauer, Jr., Cranford, Charles E. Jahnig, Rumson, and Norman J. Weinstein, Newark, N.J., assignors to Esso Research and Engineering Company, a corporation of Delaware Filed Dec. 5, 1956, Ser. No. 626,359

8 Claims. (Cl. 260—676)

The present invention relates to a process for separating and segregating straight-chained hydrocarbons from mixtures thereof with branched-chain or cyclic hydrocarbons. More particularly, the present invention relates to the separation of relatively straight-chain hydrocarbons from branched-chain isomers employing a class of natural or synthetic adsorbents termed, because of their crystalline patterns, molecular sieves. Still more particularly, the present invention relates to an improved desorption process whereby the hydrocarbon adsorbed on the sieve is recovered in a manner resulting in higher recovery in a higher state of purity and adsorbent efficiency than hitherto found possible.

It has been known for some time that certain zeolites, both naturally occurring and synthetic, have the property of separating straight-chain from branched-chain hydrocarbon isomers, as well as from cyclic and aromatic compounds. These zeolites have innumerable cavities with entrance pores of uniform size, and only molecules small enough to enter the pores can be adsorbed. The pores may vary in diameter from 3 or 4 Angstroms to 15 or more, but it is a property of these zeolites that any particular sieve has pores of a substantial uniform size.

The scientific and patent literature contains numerous references to the sorbing action of natural and synthetic zeolites. Among the natural zeolites having this sieve property may be mentioned chabasites. A synthetic zeolite with molecular sieve properties is described in U.S. 2,442,191. Zeolites vary somewhat in composition, but generally contain the elements of silicon, aluminum and oxygen as well as an alkali and/or an alkaline earth element, e.g. sodium and/or calcium. The naturally occurring zeolite analcite, for instance, has the empirical formula $NaAlSi_2O_6 \cdot H_2O$. Barrer (U.S. 2,306,610) taught that all or part of the sodium is replaceable by calcium to yield, on dehydration, a molecular sieve having the formula $(Ca, Ma_2) Al_2Si_4O_{12} \cdot 2H_2O$. Black (U.S. 2,522,426) describes a synthetic molecular sieve zeolite having the formula $4CaO \cdot Al_2O_3 \cdot 4SiO_2$. A large number of other naturally occurring zeolites having molecular sieve activity, i.e. the ability to adsorb a straight-chain hydrocarbon and exclude the branch-chain isomers due to differences in molecular size, are described in an article "Molecular Sieve Action of Solids" appearing in Quarterly Reviews, vol. III, pages 293–320 (1949), published by the Chemical Society (London).

The segregation or removal of branched-chain or straight-chain isomers from hydrocarbon mixtures, either for the purpose of enriching the mixture in branched-chain components or for isolating and recovering straight-chain isomers has become increasingly important in industry with the growing realization that the activity, potency and desired physical property of a product may depend upon the specific structure of the various possible hydrocarbons utilizable as reactants in the preparation or manufacture of the final product. Thus in the preparation of high octane fuels, the presence of paraffinic straight-chain hydrocarbons makes for a lower octane fuel. On the other hand, in the manufacture of synthetic detergents such as the alkyl aryl sulfonates, a straight-chain nuclear alkyl substituent confers better detergency characteristics than a branched-chain isomer. Numerous other examples might be cited.

Though it has in the past been proposed to make these separations, i.e. of straight chain from branched chain and cyclic hydrocarbons by molecular sieves, and though excellent and selective separations have been realized, a serious problem has arisen when it was attempted to recover the adsorbed material and to regenerate the molecular sieve or zeolite. The conventional means described in the art are steaming, purging with nitrogen or methane, evacuation, or the like. In commercial installations, it is necessary to employ a cyclic operation, i.e. an adsorption step followed by desorption and regeneration of the sieve, and thereafter another adsorption step. It has been found that regeneration by the conventional methods of heating, evacuation, steaming and the like result in a marked decline in the adsorptive capacity of the sieves. For instance, in a process wherein a virgin naphtha fraction was treated with a synthetic molecular sieve having a pore diameter of 5 Angstroms to separate straight from branched chain and cyclic constituents, and the sieves desorbed and regenerated between cycles by steam stripping followed by nitrogen flushing, the sieves decreased in capacity to 59% of fresh capacity after only three cycles. Similarly, the effect of continued treatment of the sieves with steam at the high stripping temperature causes them to deteriorate.

Substantially improved desorption has been realized when there is employed as a desorbent and regenerating means a low boiling, preferably gaseous olefin, which is itself in turn readily desorbed, at the end of the desorbing cycle, by the higher molecular weight normal paraffins. Though ethylene, propylene and n-butylene may be used, propylene has been found to be the preferred desorption agents for n-paraffins boiling within the light gasoline boiling range. Vapor phase adsorption of n-hydrocarbons from their mixtures, and olefin desorption are preferred, and it is generally desirable to carry out both cycles at substantially the same temperature.

An important problem associated with an economic olefin desorption process is the recovery and re-use of the olefinic desorbent. Thus, in the cyclic operation briefly outlined above, the effluent from a molecular sieve adsorption zone contains, during the n-paraffin adsorption part of the cycle, a mixture of n-paraffin-free hydrocarbons and olefin. This vaporous mixture must be separated, and fractionation requires either compression or refrigeration, both of which are costly and require expensive installations.

It is therefore the principal purpose of the present invention to set forth an improved method of desorbing and stripping hydrocarbons adsorbed with uniform pores and cavities of certain natural or synthetic zeolites, commonly called molecular sieves, in a manner more economic than hitherto found possible.

It is also a purpose of the present invention to provide desorption means which prolong substantially the life of the molecular sieve adsorbent.

It is a still further object of the present invention to desorb hydrocarbons from molecular sieves without employing unduly high temperatures, and in addition achieve the advantages of a substantially isothermal operation. Isothermal operation is possible because the heats of adsorption of the n-paraffins and low boiling olefins are approximately equal.

It is a still further object of the present invention to provide a means of adsorbing straight-chain paraffinic compounds and desorbing them with olefinic compounds in a manner whereby compression of vapor in recycle streams is substantially avoided and large economic advantages and savings are realized.

It is a still further object of the present invention to provide a means of desorbing straight-chain aliphatic hydrocarbons from molecular sieves whereby an improved hydrocarbon feed stream for petroleum refinery processes is obtained.

Other and further objects of the present invention will appear in the following more detailed description and claims.

In accordance with the present invention, compression of recycle gases is avoided by carrying out the adsorption step at a significantly higher pressure than the desorption step within specified critical pressure ranges. Above a certain critical range as will be developed more fully below, adsorption becomes non-selective, whereas desorption pressures less than about atmospheric result in uneconomical operations. Further in accordance with the present invention, desorption at the lower pressure is carried out in the presence of a gaseous, olefinic medium which is itself adsorbed. The difference in pressure between the adsorption and the desorption steps is determined by the pressure drop through the desorbent isoparaffin product separation system.

The relationship between the olefin desorbent, the paraffin desorbed, and the preferred desorbing temperature is shown in the table below:

| Olefin | Paraffin | Preferred Temp., °F. |
|---|---|---|
| $C_2$ | $C_3$–$C_5$ | 0–100 |
| $C_3$ | $C_5$–$C_8$ | 100–400 |
| n-$C_4$ | $C_8$–$C_{12}$ | 300–500 |

In one embodiment of the invention, a mixed branched-chain and cyclic straight-chain material, such as virgin naphtha, boiling in the $C_6$–200° F. range may be passed through a bed of molecular sieves, having pores of about 5 A. until just before normal paraffins appear in the effluent. Thereupon, without changing the temperature of the molecular sieve bed, an olefin-containing gas stream, preferably containing propylene, is passed through the bed until the paraffin has been substantially displaced. Thereafter, the cycle is repeated.

The process of the present invention may be understood more clearly when read in conjunction with the drawing.

The figure is a flowplan representing a simple adsorption-desorption cycle including novel means for pressuring and depressuring the adsorption vessel.

Turning now to the figure, there is shown an adsorption column 16, containing the molecular sieve adsorbent. The size of the pore diameter depends upon the molecular size of the material to be separated. It must be large enough to adsorb the straight-chain but not large enough to adsorb the branched-chain isomers. The adsorptive capacity and pore size of the sieve, and the structure of the hydrocarbon are related in the following manner:

| Adsorbed on 4 A. and 5 A. | Adsorbed on 5 A. but not 4 A. | Not Adsorbed on 4 A. or 5 A. | Adsorbed on 13 A. |
|---|---|---|---|
| (1) Ethane. | (1) Propane and higher n-paraffins. | (1) Iso-paraffins. | (1) All hydrocarbons within gasoline boiling range. |
| (2) Ethylene. | (2) Butene and higher n-olefins. | (2) Aromatics. | (2) Aromatics strongly adsorbed. |
| (3) Propylene. | | (3) All cyclics with 4 or more atoms in ring. | (3) Diolefins strongly adsorbed. |

In general, when it is desired to increase the octane rating of naphthas and hydrocarbon streams boiling in the gasoline range, sieves having a pore diameter of 5 A. are satisfactory.

A motor fuel prepared by the hydroforming of a hydrocarbon fraction, and boiling in the range of $C_6$–200° F., containing substantial amounts of naphthenes and aromatics as well as a minor proportion of normal paraffins is employed as feed in one embodiment of the invention. Because of the presence of the normal paraffins, the octane number of the hydroformate is relatively low, and may vary from 85 when the feed contains about 15–20% paraffins to about 95 when this is reduced to 8–10%. A feed of this type, which may contain small amounts of moisture or sulfur compounds, is introduced into the desorption system through line 2, and may be passed through preliminary feed purification zones 8 or 10. The feed may be preheated to a temperature of 200° to 400° F. This preheat is preferably accomplished by heat exchange with effluent from the adsorption step. Zones 8 and 10 contain a molecular sieve material such as 5 A., 4 A., or less. It has been found that the capacity of sieves to adsorb hydrocarbons is greatly reduced if water is present, even in small quantities, since it is more strongly adsorbed than most hydrocarbons. Certain sulfur compounds are also selectively adsorbed and difficult to desorb. Since most hydrocarbon streams available in a refinery contain small amounts of these impurities, the continued use of the sieves in such separation operations may necessitate periodic interruptions to desorb the contaminants and restore adsorbent capacity. With the use of the 4 A. type sieve, contaminants are removed but the hydrocarbons are not adsorbed. Since the capacity of the sieves for water is high, zones 8 and 10 prevent water from getting into tower 16. In the drawing, two such water adsorption systems are employed in drying and regeneration cycles so as to make the hydrocarbon separation continuous. Each of the systems in turn may comprise two alternate zones, the feed being switched from 8 to 10 when zone 8 requires regeneration. The latter is accomplished by sweeping out the water with hot gases such as air. It is understood, however, that a clean, dry feed, or one that is substantially sulfur-free, may not require this purification treatment. It is further understood that other conventional means for removal of moisture or sulfur contaminants may be employed.

The hydrocarbon feed is now passed, preferably in the vapor phase at a temperature of about 200° to 400° F. into adsorption tower 16. The adsorbent, which may be any natural or synthetic zeolite of the molecular sieve type heretofore described, may be arranged in trays, or packed on supports or be unsupported. Reaction conditions within adsorber are flow rates of 0.1–5 v./v./hr., temperatures of 175°–350° F., and pressures of 5 to about 100 p.s.i.g. High pressures cause non-selective adsorption in some cases. In order to avoid or minimize the need for subsequent propylene recycle compression, the adsorption step is carried out at a higher pressure than the desorption step.

The substantially straight-chain paraffin-free naphtha is withdrawn from tower 16 and passed via line 17 and cooler 25 to an accumulator 19 from where it may be withdrawn through line 21 or blending or for direct employment as a high octane motor fuel. The initial first cycle adsorbate is free from the desorbent.

When the sieve becomes nearly saturated with n-paraffins and does not give complete removal of them, as determined by conventional means such as refractive index, gravity or spectographic analysis of the effluent, the flow of hydrocarbon feed through line 2 is halted and the desorption cycle begins. An olefin-containing gas, preferably one comprising a substantial proportion of propylene, and preheated to 200° to 400° F. is passed through line 1, dried if desired in purifiers 7 or 9 containing the same or similar sieve type as in zones 8 and 10, and passed into tower 16. Cracked refinery gases, containing besides propylene, minor amounts of ethane and propane and butylene may be used for this purpose. Without changing the temperature of the tower 16 appreciably, the desorbing gas replaces the paraffins adsorbed on the sieves with the olefins. The pressure, however, is decreased so that, during the desorption cycle, it is in the range of 0 to 20 p.s.i.g. This alternate high pressure adsorption and low pressure desorption eliminates or minimizes the need for recycle olefin compression. A preferred means for maintaining the adsorption cycle at a higher pressure than the desorption cycle is as follows:

After the adsorption step has been completed valve 50 is opened and the vapors contained within adsorption column 16 are allowed to flow through lines 40 and 44 to quench vessel 42 maintained at a temperature corresponding to a pressure which is below the preferred desorption pressure. Thus in the case of a $C_6$-200° F. light virgin naphtha, the temperature is about 175° F. at a pressure of about 4 p.s.i.g. This temperature is maintained by mixing cold feed with the hot vapors removed from the adsorption column 16. The cold feed enters vessel 42 through lines 48 and 44. The vapors and the cold liquid feed may be contacted in vessel 42 in any conventional manner such as jets, packing, disc-and-donut contacting means and the like. By this means the pressure in vessel 16 is brought down to the desired desorption pressure level.

The paraffinic constituents of the sieve are displaced by the light olefinic desorbing gas. The latter is of lower molecular weight than the naphtha, since the zeolites have a substantially greater affinity for olefins than for paraffins of the same number of carbon atoms. However, some of the olefins may also break through, and separation of olefin from n-paraffin is therefore required. The desorbed n-paraffins are withdrawn through line 18, cooled in cooler 26, and passed to accumulator-separator 20. The olefinic desorbent gases may be withdrawn through line 24 and may be recycled or employed as desired. The n-paraffin produced from line 22 may be isomerized, aromatized or reformed, all in a manner known per se.

At the end of the desorption cycle, adsorption is resumed. The vessel 16 is repressured to the adsorption pressure of 10 to 100 p.s.i.g. This may be readily accomplished by resuming the flow of the vaporized feed into the adsorption column. During this pressuring step, an incremental feedstream may be added to the feed just upstream of the drier to minimize fluctuation in the feed going to vessel 16. This incremental feed stream may be brought to the adsorption pressure in the liquid state by means of a conventional liquid pump (not shown). In a preferred embodiment of this invention additional liquid, i.e. the incremental feed stream, is added to the feed from vessel 42 through line 46 in order not to interfere with the normal amount of feed going to the adsorption step.

The olefins are now in turn desorbed by the n-paraffins. The effluent from vessel 16 now withdrawn through line 17 comprises a mixture of n-paraffin-free hydrocarbons plus propylene. This mixture must be resolved into its components. The olefins are withdrawn along with the unadsorbed branched-chain and aromatic constituents through line 17, cooler 25 and accumulator 19. They are readily separated from the gasoline fraction by simple flashing and distillation and are recycled to a second column 16', which is being desorbed, without need for compression of gases. The product withdrawn through line 21 is high octane isoparaffins and/or cyclic hydrocarbons, free of propylene desorbent.

The process of the present invention may be modified in many respects and still be within the scope thereof. Butenes may also be employed advantageously as desorbing agents as well as propylene, particularly, for higher molecular weight paraffins. The separations may be employed for substantially any feed containing straight chain compounds such as n-paraffins, the sieve pore diameter being chosen in accordance with the molecular size. Though a fixed-bed operation has been described, the separation cycles may also be carried out by means of the so-called fluidized solids technique in fluidized beds or by moving bed techniques. The process of the present invention is particularly adapted to be employed in association with various means for upgrading virgin naphthas to form high octane motor fuels. As pointed out, the process is advantageously employed in connection with a fluid or fixed bed hydroforming operation wherein naphthas are treated at elevated temperatures and pressures in the presence of a catalyst such as platinum with hydrogen under conditions to convert a substantial portion of the hydrocarbons present to aromatics. The resulting hydroformate is then enhanced in octane value by removal of n-paraffins by the sieves. The adsorbate may then be recovered and recycled to the hydroformer for further conversion, or isomerized.

A particular desirable manner of operating vessel 16 is to reverse the flow stream, i.e. feeding into the vessel during the adsorption cycle at the opposite end from that where the desorbent is fed during the previous cycle. This technique, in combination with stopping short of breakthrough, provides a buffer zone of sieves, and prevents n-paraffins from mixing with the n-paraffin-free product.

In one modification, molecular sieves are used in the separation of n-paraffins from a catalytically reformed light virgin naphtha. In one case a 93 octane number reformate was treated with 5 A. sieve to give the following results:

Yield, vol. percent on reformate _____ percent __ 86.5
Res. Octane No _____ 101

In addition, a 13.5% yield of n-paraffins was recovered which is available for reprocessing. If the virgin naphtha had been reformed to 101 RON (Road Octane Number), the yield on virgin naphtha would have been 58%. First reforming, then separating the n-paraffins with a 5 A. sieve gives a yield of 63%, assuming discard of the n-paraffins. The total combination yield of 101 RON gasoline may be increased to 69% by reforming or isomerizing the n-paraffins. Thus, in this case, catalytic reforming to 93 RON plus a 5 A. molecular separation to improve the reformate octane rating, leads to 5 to 10% higher yields than severe reforming to the same octane level.

The high octane product resulting from sieve separations contain 0 to 2% n-paraffins depending upon operating procedure. The lower paraffin contents are obtained by stopping adsorption short of massive breakthrough. In order to keep the n-paraffin content to values below 1%, it is necessary that the feed and desorbent streams enter opposite ends of the bed. This overcomes the possibility of immediate n-paraffin breakthrough due to buildup in a zone where the desorbent concentration is low. It is also necessary to use a minimum of one liquid volume of desorbent to replace one liquid volume of n-paraffins. Use of less desorbent will not sufficiently remove the adsorbed n-paraffins and will cause gradual increase in n-paraffin content of the high octane product stream, for a given set of operating conditions.

Adsorption at higher pressure than desorption, and the use of one liquid volume of desorbent to one liquid volume of n-paraffin, eliminates the need for recycle compression. The molecular sieve bed provides desorbent capacity and the pressure difference provides the driving force necessary to recycle the desorbent stream. Where equilibrium considerations require the use of greater amounts of desorbent, partial recycle compression is needed. Only the desorbent which breaks through with the n-paraffins during desorption need be compressed for recycle. The rest of the stream is stored in the molecular sieve bed. The amount of propylene needed for desorbing $C_5$ to $C_7$ n-paraffins varies from one to three liquid volumes per liquid volume of n-paraffins. The amount of butylene needed is somewhat less. The greater the quantity of desorbent used, the greater will be the useful capacity of the sieve.

The quantity of high octane product taken overhead in the desorbent stream can be set by the adsorption equipment design. It is necessary and pratical to reduce this potential loss to negligible amounts. The quantity lost may range from 0.05 to 2% on feed. The lower quantities may be obtained by adequate heavy wash oil coupled with sufficient contacting stages. The use of a gasoline component stream for adsorption readily provides sufficient wash oil and eliminates the need for wash oil recovery. This combination allows almost 100% recovery of the high octane product.

Some cyclic and branched chain hydrocarbons may be adsorbed in the molecular sieve bed at elevated pressures. The mechanism involved may be adsorption on the molecular sieve binder, adsorption on the crystal surface, or adsorption in the crystal cavity due to momentary or permanent expansion of the pore openings. This non-selective adsorption is not important up to pressures of about 3 to 4 atmospheres, and the normal paraffin stream contains only small amounts of the desired gasoline components. The use of low pressures will keep this loss to 0 to 2% on feed. Very low losses can be obtained by depressuring the adsorption vessels by direct quench with cold feed. The cyclic and branched chain hydrocarbons which are adsorbed will desorb first during depressuring and be recycled with the feed.

It is further to be understood that other means of separating the olefinic desorbent from the desorbate may be employed. One such is a scrubbing oil such as a heavy catalytic naphtha or a gasoline fraction which selectively adsorbs the desorbate but does not adsorb significant amounts of the olefinic desorbent.

Three or more reactor vessels, identical to vessel 16, are used to allow a continuous processing scheme. At all times, one or more vessels are being used for adsorption, one or more are being used for desorption, and one or more are available for pressuring or depressuring. Additional spare vessels may be used where periodic regeneration of the molecular sieve is desirable.

What is claimed is:

1. An improved process for separating straight-chain paraffinic hydrocarbons from a feed containing said straight-chain hydrocarbons in mixture with non-straight-chain hydrocarbons which comprises passing a gaseous stream of said feed into a molecular sieve zone containing molecular sieves having pore diameters of about 5 Angstrom units; maintaining an adsorption temperature of about 175° to about 400° F. and an adsorption pressure of from about 5 to about 100 p.s.i.g. in said sieve zone; withdrawing unadsorbed non-straight-chain hydrocarbons from said sieve zone while adsorbing straight-chain hydrocarbons on said molecular sieves; establishing open communication between said sieve zone and a quenching zone maintained at a lower pressure than said sieve zone, depressuring said sieve zone by passing at least a portion of the vapors in said sieve zone to said quenching zone, maintaining a reduced pressure in said quenching zone by quenching said vapors with cold feed to a temperature corresponding to a pressure substantially the same as a desired desorption pressure until said desorption pressure obtains within said sieve zone; passing a hydrocarbon gas into said sieve zone whereby normal paraffins are desorbed and said hydrocarbon gas adsorbed; maintaining a pressure of from about 5 to 20 p.s.i.g. in said sieve zone during said desorption step, said desorption pressure being lower than said adsorption pressure; withdrawing said normal desorbed hydrocarbons; thereafter repressuring the said sieve zone to adsorption pressures; and again passing said gaseous stream into said sieve zone.

2. The process of claim 1 wherein adsorption and desorption are carried out substantially isothermally.

3. The process of claim 1 wherein said sieve zone is repressured after the desorption cycle to adsorption pressures by passing an incremental feedstream in the liquid phase at adsorption pressures to said sieve zone.

4. The process of claim 3 wherein said incremental feedstream is a portion of the product resulting from said quenching.

5. The process of claim 1 wherein said feed mixture is freed from water and sulfur-containing contaminants prior to passage to said zone.

6. The process of claim 1 wherein said mixtures to be adsorbed is passed into said zone in a direction opposite to the direction of flow of desorbing gases through said zone.

7. The process of claim 1 wherein said hydrocarbon gas is an olefin-comprising gas.

8. An improved process for separating straight chain paraffinic hydrocarbons from a feed containing said straight chain hydrocarbons mixed with non-straight chain hydrocarbons which comprises passing a gaseous stream of said feed into a molecular sieve zone containing molecular sieves having pore diameters of about 5 Angstrom units; maintaining an adsorption temperature of about 175° to about 400° F. and an adsorption pressure of from about 5 to about 100 p.s.i.g. in said sieve zone; withdrawing unadsorbed non-straight chain hydrocarbons from said sieve zone while adsorbing straight chain hydrocarbons on said molecular sieves, establishing open communication between said sieve zone and a second zone maintained at a lower pressure than said sieve zone, depressuring said sieve zone by passing at least a portion of the vapors in said sieve zone to said second zone, maintaining a reduced pressure in said second zone substantially the same as a desired desorption pressure until said desorption pressure obtains within said sieve zone; passing a hydrocarbon gas into said sieve zone whereby normal paraffins are desorbed and said hydrocarbon gas is adsorbed; maintaining a pressure of from about 5 to 20 p.s.i.g. in said sieve zone during said desorption step, said pressure being lower than during the adsorption step; withdrawing said normal desorbed hydrocarbons; thereafter repressuring to adsorption pressures by passing an incremental feed stream from said second zone into said sieve zone, and again passing said gaseous stream into said sieve zone.

References Cited in the file of this patent

UNITED STATES PATENTS

| 2,522,426 | Black | Sept. 12, 1950 |
| 2,530,300 | Hirschler | Nov. 14, 1950 |
| 2,586,889 | Vesterdal et al. | Feb. 26, 1952 |
| 2,628,933 | Eagle et al. | Feb. 17, 1953 |
| 2,818,137 | Richmond et al. | Dec. 31, 1957 |
| 2,818,449 | Christensen et al. | Dec. 31, 1957 |
| 2,818,455 | Ballard et al. | Dec. 31, 1957 |
| 2,834,429 | Kinsella et al. | May 13, 1958 |
| 2,859,256 | Hess et al. | Nov. 4, 1958 |
| 2,882,244 | Milton | Apr. 14, 1959 |
| 2,886,508 | Hess et al. | May 12, 1959 |